United States Patent
Herman (10) Patent No.: US 12,304,499 B2
(45) Date of Patent: May 20, 2025

(54) PREDICTION OF OPERATOR INPUT TO A STEERING ELEMENT

(71) Applicant: Ford Global Technologies, LLC, Dearborn, MI (US)

(72) Inventor: David Michael Herman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 18/313,556

(22) Filed: May 8, 2023

(65) Prior Publication Data
US 2024/0375664 A1    Nov. 14, 2024

(51) Int. Cl.
*B60W 40/08* (2012.01)
*G06V 40/18* (2022.01)

(52) U.S. Cl.
CPC ............ *B60W 40/08* (2013.01); *G06V 40/18* (2022.01); *B60W 2420/403* (2013.01); *B60W 2510/20* (2013.01); *B60W 2540/223* (2020.02); *B60W 2540/225* (2020.02)

(58) Field of Classification Search
CPC .... G06V 20/597; G06T 7/50; B60W 60/0027; B60W 60/0053; B60W 60/0051; B62D 15/025; B62D 15/0245; B62D 6/04; B62D 6/00
See application file for complete search history.

(56) References Cited

U.S. PATENT DOCUMENTS

| | | | | |
|---|---|---|---|---|
| 10,160,484 B2 * | 12/2018 | Lee | .......................... | B62D 6/00 |
| 11,130,494 B2 * | 9/2021 | Ryne | ................. | B60W 60/0053 |
| 2007/0203617 A1 * | 8/2007 | Haug | .................... | B62D 15/025 |
| | | | | 701/1 |
| 2011/0257844 A1 * | 10/2011 | Cassar | ............... | B62D 15/0245 |
| | | | | 701/41 |
| 2015/0105981 A1 * | 4/2015 | Hestermeyer | ............ | B62D 6/04 |
| | | | | 701/41 |
| 2017/0029021 A1 * | 2/2017 | Lee | ....................... | B62D 15/025 |
| 2020/0216079 A1 * | 7/2020 | Mahajan | ........... | B60W 60/0051 |
| 2021/0405642 A1 * | 12/2021 | Danford | ............ | B60W 60/0027 |

(Continued)

FOREIGN PATENT DOCUMENTS

| | | |
|---|---|---|
| CN | 109902562 A | 6/2019 |
| KR | 20180090644 A | 8/2018 |

OTHER PUBLICATIONS

Moreillon, M., et al., "Hands On-Off Detection Based on EPS Sensors," JTEKT, 2016, 7 pages.

(Continued)

*Primary Examiner* — Yuri Kan
(74) *Attorney, Agent, or Firm* — Frank Lollo; Brooks Kushman P.C.

(57) ABSTRACT

A system can include a computer having a processor coupled to a memory, the memory storing instructions executable by the processor to capture an image of an operator positioned in a steering position. The instructions can additionally be to determine, based on parameters extracted from the captured image, a confidence level that output data from a torque sensor represents torque applied by an operator to a steering element. The instructions can additionally be to actuate a component in a vehicle based on the confidence level.

20 Claims, 4 Drawing Sheets

(56) References Cited

U.S. PATENT DOCUMENTS

2022/0402499 A1    12/2022   Carroll et al.
2024/0078819 A1*   3/2024   Herman .................... G06T 7/50

OTHER PUBLICATIONS

Mehrabi, N., et al., "A Physics-Based Musculoskeletal Driver Model to Study Steering Tasks," Journal of Computational and Nonlinear Dynamics, Mar. 2015, 8 pages.

Pyeon, H. et al., "Deep Learning-Based Driver's Hands on/off Prediction System Using In-Vehicle Data," sensors, Jan. 2023, 17 pages.

Johansson, E., et al., "System for Hands-on Steering Wheel Detection Using Machine Learning," Department of Mechanics and Maritime Science, 2021, 72 pages.

* cited by examiner

PREDICTION OF OPERATOR INPUT TO A STEERING ELEMENT

BACKGROUND

A torque sensor can be utilized in a vehicle steering system to determine an amount of torque applied to a steering wheel, e.g., by an operator's hand and/or due to some other source.

DETAILED DESCRIPTION

This disclosure provides techniques for enhancing detection of operator contact with a steering wheel. In examples, a camera mounted on a dashboard of a vehicle, and/or other sensors, can obtain an image that may include an operator positioned in the driver's seat of the vehicle in which certain portions of the operator, e.g., one or more of the operator's hands, forearms, etc., are not visible within the camera field-of-view. A computer can then execute programming utilizing the image to construct a nodal model of the operator. The computer can additionally estimate locations of features of the operator that are obscured from the camera's field-of-view. The computer can then execute programming to determine a level of confidence as to whether the nodal model of the operator, which includes the estimated locations of features obscured from the camera's view, is consistent with a nodal model of an operator with his or her hands in contact with the steering wheel. Based on a threshold level of confidence (e.g., greater than 95%) that the operator's hand(s) are in contact with the steering wheel, the computer can utilize a torque measurement from a sensor positioned on a steering column coupled to the steering wheel. The torque measurement can then be input to an assisted driving application. Conversely, based on less than the threshold level of confidence (e.g., less than 95%) that the operator's hand(s) are in contact with the steering wheel, the computer can execute programming to actuate, for example, a notification for the operator to place one or more hands into contact with the steering wheel.

In an example, a system can include a computer having a processor and a memory, the memory storing instructions executable by the processor to capture an image of an operator positioned in a steering position and to determine, based on parameters extracted from the captured image, a correlation between a confidence level that the operator is in contact with a steering element and data output from a torque sensor. The instructions may additionally be to actuate a component in a vehicle based on the determined correlation.

In an example, the output data from the torque sensor can represent torque applied as a function of time and the steering element can include a steering wheel.

In an example, the output data from the torque sensor can be obtained over a duration in which the image of the operator is captured during the duration.

In an example, the output data from the torque sensor can represent a torsion moment applied to the steering element.

In an example, the instructions can further include instructions to extract parameters of the operator via a non-camera sensor.

In an example, the output data from the torque sensor can indicate a weight applied to the steering element.

In an example, the instructions can further include instructions to obtain input signals from a capacitive sensor of the steering element.

In an example, the extracted parameters can include a head position of the operator.

In an example, the extracted parameters can include an eye gaze direction of the operator.

In an example, the extracted parameters can include a location of an arm of the operator.

In an example, the instructions can further include instructions to estimate a location of a feature of the operator obscured from a field-of-view of a camera capturing the image.

In an example, the instructions can further include instructions to implement a learning model of the operator having one or more hands in contact with the steering element based on one or more of a head position of the operator, an eye gaze direction of the operator, or a location of an arm of the operator.

In an example, the instructions can further include instructions to correlate the data output from the torque sensor prior to actuation of the component.

In an example, a method can include capturing an image of an operator positioned in a steering position and determining, based on parameters extracted from the captured image, a correlation between a confidence level that the operator is in contact with a steering element and data output from a torque sensor. The method can additionally include actuating a component in a vehicle based on the confidence level.

In an example, the output data from the torque sensor represents torque applied as a function of time, and wherein the steering element can include a steering wheel.

In an example, the output data from the torque sensor can be obtained over a duration, and the image of the operator can be captured during the duration.

In an example, the image can include a camera image and/or an image derived from a non-camera sensor.

In an example, the extracted parameters can include a head position of the operator, an eye gaze direction of the operator, and/or an orientation of an arm of the operator.

In an example, the method can additionally include estimating a location of a feature of the operator obscured from a field-of-view of a camera capturing the image.

In an example, the method can additionally include implementing a learning model of operator contact with the steering element based on one or more of a head position of the operator, an eye gaze direction of the operator, and/or an orientation of an arm of the operator.

Figure 1:
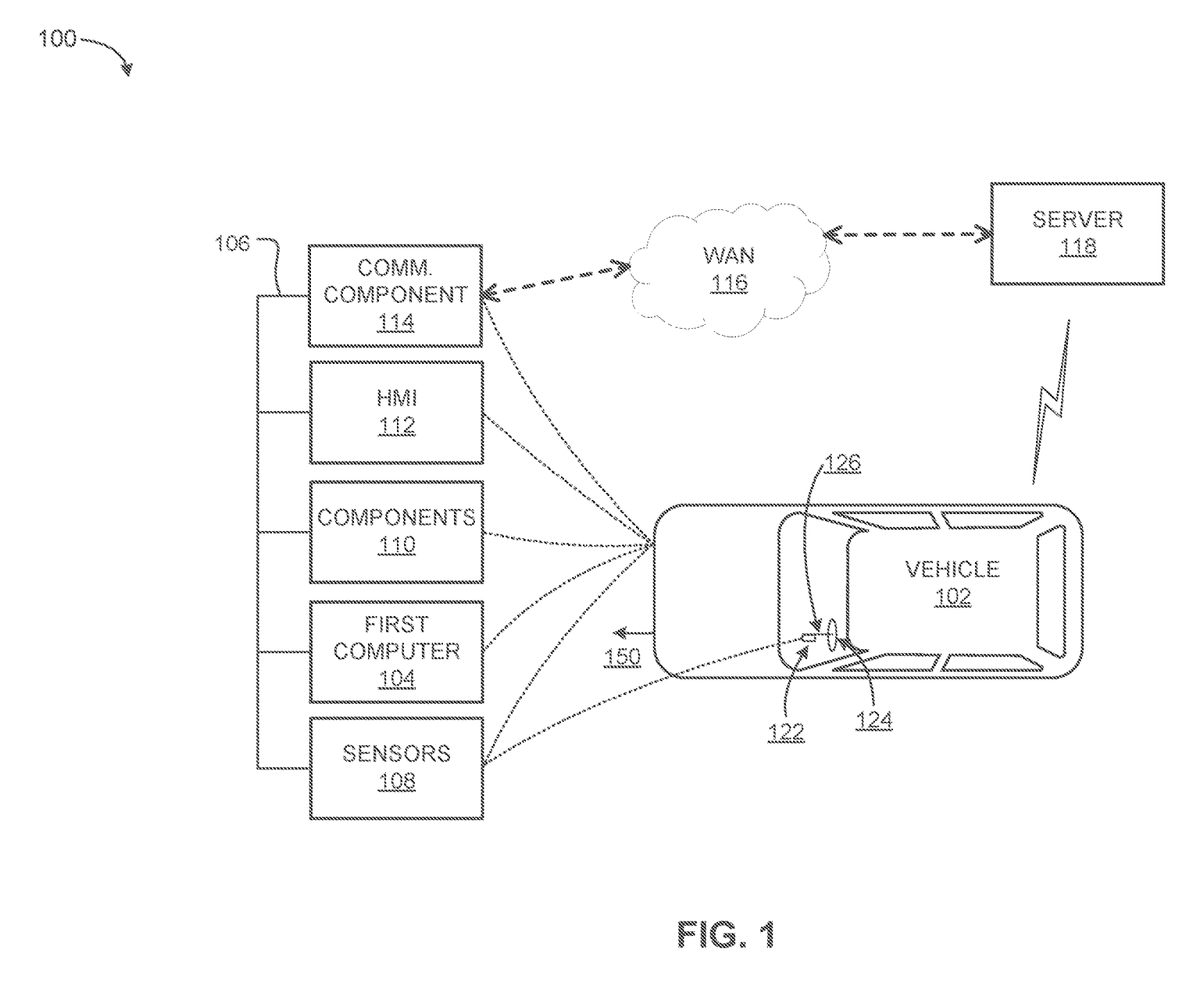
FIG. 1 is a block diagram of an example vehicle.

FIG. 1 is a block diagram of an example vehicle. As shown in FIG. 1, system 100 includes vehicle 102, that includes computer 104 that is communicatively coupled, via vehicle network 106, to various elements including sensors 108, subsystems or components 110, such as steering, propulsion, braking, human machine interface (HMI) 112, and communication component 114. Computer 104, and server 118 discussed below, include a processor and a memory. A memory of computer 104, such as those described herein, includes one or more forms of non-transitory media readable by computer 104, and can store instructions executable by computer 104 for performing various operations, such that the vehicle computer is configured to perform the various operations, including those disclosed herein.

For example, computer 104 can include a generic computer with a processor and memory as described above and/or may comprise an electronic control unit (ECU) or a controller for a specific function or set of functions, and/or a dedicated electronic circuit including an ASIC (application specific integrated circuit) that is manufactured for a particular operation, (e.g., an ASIC for processing data from sensors and/or communicating data from sensors 108). In another example, computer 104 may include an FPGA (Field-Programmable Gate Array), which is an integrated circuit manufactured to be configurable by a user. In example embodiments, a hardware description language such as VHDL (Very High-Speed Integrated Circuit Hardware Description Language) may be used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected or coupled to the FPGA circuit.) In some examples, a combination of processor(s), ASIC(s), and/or FPGA circuits may be included in computer 104. Further, computer 104 may include a plurality of computers in the vehicle (e.g., a plurality of ECUs or the like) operating together to perform operations ascribed herein to the computer 104.

A memory of computer 104 can include any type, such as hard disk drives, solid state drives, or any volatile or non-volatile media. The memory can store the collected data transmitted by sensors 108. The memory can be a separate device from computer 104, and computer 104 can retrieve information stored by the memory via a communication network in the vehicle such as vehicle network 106, e.g., over a controller area network (CAN) bus, a local interconnect network (LIN) bus, a wireless network, etc. Alternatively or additionally, the memory can be part of computer 104, for example, as a memory internal to computer 104.

Computer 104 can include or access instructions to operate one or more components 110 such as vehicle brakes, propulsion (e.g., one or more of an internal combustion engine, electric motor, hybrid engine, etc.), steering, climate control, interior and/or exterior lights, infotainment, navigation etc., as well as to determine whether and when computer 104, as opposed to a human operator, is to control such operations. Computer 104 can include or be communicatively coupled, e.g., via vehicle network 106, to more than one processor, which can be included in components 110 such as sensors 108, electronic control units (ECUs) or the like included in the vehicle for monitoring and/or controlling various vehicle components, e.g., a powertrain controller, a brake controller, a steering controller, etc.

Vehicle sensors 108 can further include torque sensor 122, which operates to measure torque (i.e., a torsion moment) applied to a steering element, e.g., steering wheel 124, as an operator applies a rotational force to the steering wheel to control the heading of vehicle 102. In an example, torque sensor 122 is mounted to steering column 126 to measure torque in the range of 0.02 Newton meters (N-m) to 0.2 N-m. Torque sensor 122 can include a calibrated strain gauge, for example, to provide a voltage signal that is proportional to torque applied to steering wheel 124. In an example, torque sensor 122 is capable of measuring torque at all times, or at virtually all times, that an operator steers vehicle 102 with at least one hand resting on steering wheel 124 as vehicle 102 proceeds along path 150. In response to an operator removing their hands from steering wheel 124, torque sensor 122 measures zero torque, or other negligible amount of torque, conveyed to steering column 126. It is noted that torque sensor 122 can measure a torque corresponding to other objects placed into contact with steering wheel 124, such as various foreign objects, e.g., laptop computers, water bottles, coffee containers, etc. It is noted that although FIG. 1 shows a steering wheel, techniques described herein can apply to steering components other than a steering wheel of a vehicle, such as a joystick, an aircraft control yoke, etc.

Steering wheel 124 can include, e.g., mounted in, on, or proximate to the steering wheel 124, additional sensors 108 to determine whether an operator's hand is in contact with steering wheel 124, such as a capacitive sensor. Such sensors can operate to register a change in self-capacitance in response to a hand of an operator being proximate with a capacitive sensor mounted on steering wheel 124. However, it is also noted that capacitance, e.g., self-capacitance (such as capacitance of single capacitive sensor), mutual capacitance (such as capacitance between two or more capacitive sensors), etc., may be affected by the proximity of certain foreign objects, such as water bottles, coffee containers, etc. In an example, other sensors may be positioned on steering wheel 124, such as sensors to measure force, torque, temperature, and other properties in a global or local coordinate reference position and/or orientation that may relate directly or indirectly to operator input to steering wheel.

Computer 104 may be generally arranged for communications on vehicle network 106 that can include a communications bus in the vehicle, such as a controller area network CAN or the like, and/or other wired and/or wireless mechanisms. Vehicle network 106 corresponds to a communications network, which can facilitate exchange of messages between various onboard vehicle devices, e.g., sensors 108, components 110, computer 104 and a computer onboard vehicle 102. Computer 104 can be generally programmed to send and/or receive, via vehicle network 106, messages to and/or from other devices in vehicle, e.g., any or all of ECUs, sensors 108, actuators, components 110, communications module, human machine interface (HMI) 112. For example, various component 110 subsystems (e.g., components 110 can be controlled by respective ECUs).

Further, in implementations in which computer 104 actually comprises a plurality of devices, vehicle network 106 may be used for communications between devices represented as computer 104 in this disclosure. For example, vehicle network 106 can provide a communications capability via a wired bus, such as a CAN bus, a LIN bus, or can utilize any type of wireless communications capability. Vehicle network 106 can include a network in which messages are conveyed using any other wired communication technologies and/or wireless communication technologies, e.g., Ethernet, Wi-Fi®, Bluetooth®, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices onboard a vehicle. For example, vehicle network 106 can include a CAN bus, in which some in-vehicle sensors and/or components communicate via a CAN bus, and a wired or wireless local area network in which some device in vehicle communicate according to Ethernet, Wi-Fi®, and/or Bluetooth communication protocols.

Vehicle 102 typically includes a variety of sensors 108 in addition to torque sensors, capacitive sensors, and other sensors related to determining whether an operator has placed a hand into contact with steering wheel 124. Sensors 108 can include a suite of devices that can obtain one or more measurements of one or more physical phenomena. Some of sensors 108 detect variables that characterize the operational environment of the vehicle, e.g., vehicle speed settings, vehicle towing parameters, vehicle braking parameters, engine torque output, engine and transmission temperatures, battery temperatures, vehicle steering parameters, etc. Some of sensors 108 detect variables that characterize the physical environment of vehicle 102, such as ambient air temperature, humidity, weather conditions (e.g., rain, snow, etc.), parameters related to the inclination or gradient of a road or other type of path on which the vehicle is proceeding, etc. In example embodiments, sensors 108 can operate to detect the position or orientation of the vehicle utilizing, for example, signals from a satellite positioning system (e.g., global positioning system or GPS); accelerometers, such as piezo-electric or microelectromechanical systems MEMS; gyroscopes such as rate, ring laser, or fiber-optic gyroscopes; inertial measurement units IMU; and magnetometers. In example embodiments, sensors 108 can include sensors to detect aspects of the environment external to vehicle 102, such as radar sensors, scanning laser range finders, cameras, etc. Sensors 108 can also include light detection and ranging (LIDAR) sensors, which operate to detect distances to objects by emitting a laser pulse and measuring the time of flight for the pulse to travel to the object and back. Sensors 108 may include a controller and/or a microprocessor, which execute instructions to perform, for example, analog-to-digital conversion to convert sensed analog measurements and/or observations to input signals that can be provided to computer 104, e.g., via vehicle network 106.

Computer 104 can be configured for utilizing vehicle-to-vehicle (V2V) communications via communication component 114 and/or may interface with devices outside of the vehicle, e.g., through wide area network (WAN) 116 via V2V communications. Computer 104 can communicate outside of vehicle 102, such as via vehicle-to-infrastructure (V2I) communications, vehicle-to-everything (V2X) communications, or V2X including cellular communications C-V2X, and/or wireless communications cellular dedicated short-range communications DSRC, etc. Communications outside of vehicle 102 can be facilitated by direct radio frequency communications and/or via network server 118. Communications component 114 can include one or more mechanisms by which computer 104 communicates with vehicles outside of vehicle 102, including any desired combination of wireless, e.g., cellular, wireless, satellite, microwave, radio frequency communication mechanisms and any desired network topology or topologies when a plurality of communication mechanisms are utilized.

Vehicle 102 can include HMI 112 (human-machine interface), e.g., one or more of an infotainment display, a touchscreen display, a microphone, a speaker, a haptic device, etc. A user, such as the operator of vehicle 102, can provide input to devices such as computer 104 via HMI 112. HMI 112 can communicate with computer 104 via vehicle network 106, e.g., HMI 112 can send a message including the user input provided via a touchscreen, microphone, a camera that captures a gesture, etc., to computer 104, and/or can display output, e.g., via a display, speaker, etc. Further, operations of HMI 112 can be performed by a portable user device (not shown) such as a smart phone or the like in communication with computer 104, e.g., via Bluetooth or the like.

WAN 116 can include one or more mechanisms by which computer 104 may communicate with server 118. Server 118 can include an apparatus having one or more computing devices, e.g., having respective processors and memories and/or associated data stores, which may be accessible via WAN 116. In example embodiments, vehicle 102 could include a wireless transceiver (i.e., transmitter and/or receiver) to send and receive messages outside of vehicle 102. Accordingly, the network can include one or more of various wired or wireless communication mechanisms, including any desired combination of wired e.g., cable and fiber and/or wireless, e.g., cellular, wireless, satellite, microwave, and radio frequency communication mechanisms and any desired network topology or topologies when multiple communication mechanisms are utilized. Exemplary communication networks include wireless communication networks, e.g., using Bluetooth, Bluetooth Low Energy BLE, IEEE 802.11, V2V or V2X such as cellular V2X CV2X, DSRC, etc., local area networks and/or wide area networks 116, including the Internet.

In an example implementation, computer 104 can obtain an image of a portion of a vehicle 102 interior that may include an operator seated in the driver's seat of vehicle 102 utilizing a camera mounted on the dashboard of the vehicle. In some instances, the image of the operator can include the operator's head, neck, shoulders, chest, and upper arms, for example, but may exclude an image of the operator's hands. Accordingly, suitable image processing programming executed by computer 104 can extract parameters of the image to form a nodal model of the portion of the operator's body that lies within the camera's field of view. Computer 104 can additionally execute programming to estimate the locations of features excluded or obscured from the field-of-view of the camera. Computer 104 can further execute programming to determine a level of confidence as to whether the nodal model of the operator is consistent with, or at least accords with, a nodal model of an operator with one or more hands placed into contact with the steering wheel. Responsive to the confidence level meeting a predetermined threshold (e.g., greater than 95%) that the operator's hand(s) are at a location on the steering wheel, computer 104 may obtain a measurement steering column torque. The measurement of steering column torque can then be input to an assisted driving application or advanced driver assistance system (ADAS). Conversely, responsive to the confidence level being below the predetermined threshold, computer 104 can execute programming to actuate or generate a signal to indicate that one or more of the operator's hands are not in contact with steering wheel 124. Under such circumstances, measurements of steering column torque, which may be representative of the weight of a foreign object, e.g., water bottle, cup, computing device, etc., placed on the steering wheel can be discounted by the assisted driving application. Thus, advantageously, the operator can be confident that assisted driving functions are being utilized in a manner that accords with vehicle operations guidelines, thus influencing the experience of operating vehicle 102 in a positive manner. Operations, systems, and methods described herein should always be implemented and/or performed in accordance with an applicable owner's/user's manual and/or safety guidelines.

Exemplary System Operations

Figure 2A:
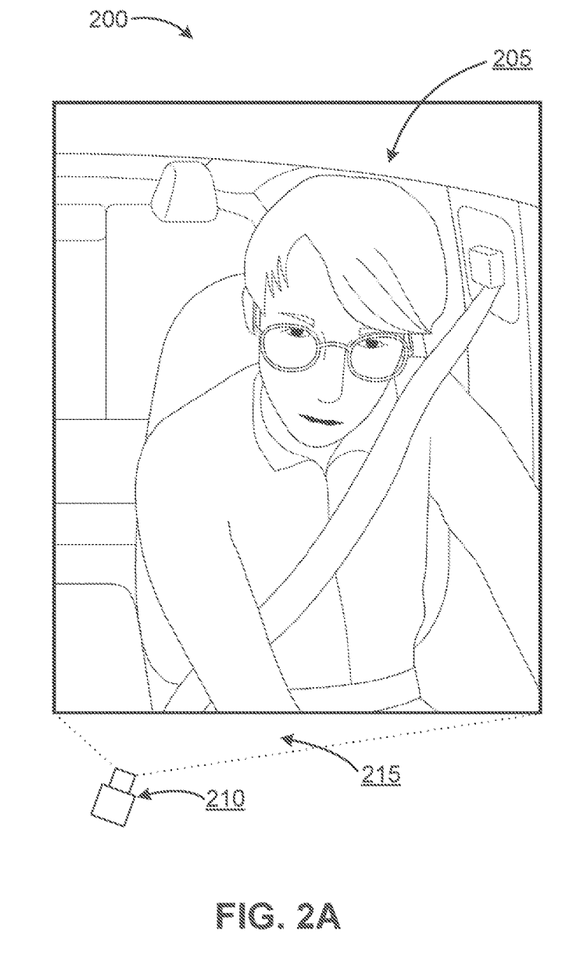
FIG. 2A is an example camera view of an operator seated in a vehicle.

FIG. 2A is an example camera view 200 of operator 205 seated in vehicle 102. The camera view of FIG. 2A may be obtained via dashboard mounted camera 210 of vehicle 102, which may be positioned near a center portion of the dashboard of vehicle 102. Dashboard mounted camera 210 can provide field-of-view 215 that includes operator 205 in a steering position of the vehicle, a passenger to the right of operator 205 as well as passengers located behind operator 205. Dashboard mounted camera 210 may include any camera imaging device capable of detecting electromagnetic radiation in a range of wavelengths. For example, dashboard mounted camera 210 may detect visible light, infrared radiation, ultraviolet light, or some range of wavelengths including visible, infrared, and/or ultraviolet light. For example, a dashboard mounted camera can include image sensors such as charge-coupled devices (CCD), active-pixel sensors such as complementary metal-oxide semiconductor (CMOS) sensors, etc. In some examples, images captured by dashboard mounted camera 210 may be complemented or augmented by additional non-camera sensors of sensors 108. In some examples, images captured by dashboard mounted camera 210 may be complemented and/or fused with images captured by other cameras of vehicle 102. Alternatively, or in addition, images of operator 205, which may be fused with or complemented by images from other cameras of vehicle 102, may be fused with depth measurements and/or velocity measurements indicating movements of operator 205 based on signals from a dashboard mounted radar.

As seen in FIG. 2A, operator 205 appears to have directed a gaze in a direction away from a forward direction with respect to vehicle 102, so as to view and/or interact with a control of the vehicle, e.g., infotainment display, climate control interface, etc. As also seen in FIG. 2A, operator 205 has dipped the right shoulder in a manner that may be consistent with interacting with a dashboard mounted control of vehicle 102. As yet further seen in FIG. 2A, the hand positions of operator 205 are obscured from view of dashboard mounted camera 210. However, detection of whether operator 205 has placed one or more hands into contact with steering wheel 124 of vehicle 102 can be estimated by way of additional processing, such as by way of image processing and other programming of computer 104 as described further hereinbelow.

Figure 2B:
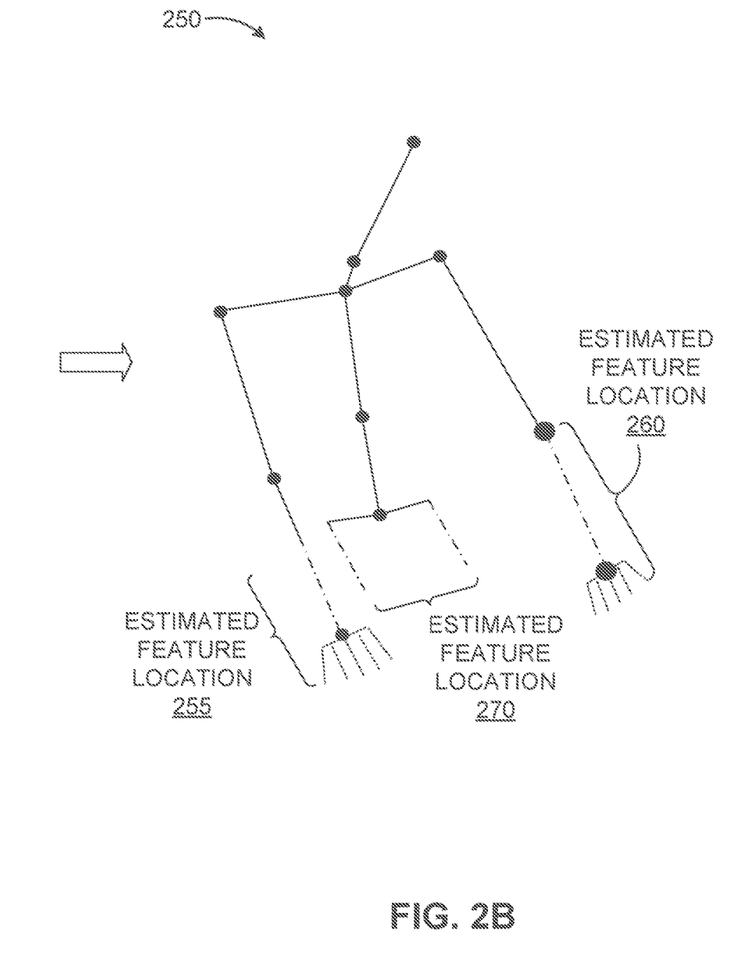
FIG. 2B is an example nodal model of the operator of FIG. 2A.

FIG. 2B is an example nodal model 250 of operator 205 of FIG. 2A. In this context, a "nodal model" means a representation of operator 205 by a system of nodes connected by lines to represent body parts or features of operator 205. Thus, in the example of FIG. 2B, an image of operator 205 may be represented by nodes representing shoulders, elbows, hips, etc., of the operator 205, wherein lines are drawn to connect the nodes representing such features. Nodal model 250 can be generated utilizing a skeletonization technique that operates to reduce captured images to, for example, one-pixel wide representations. In this context, a "skeletonization" technique means representing features of the operator 205 in the image by a nodal model just described. Thus, in FIG. 2B, a skeletonization technique has been applied to operator 205, so as to represent features of operator 205 by nodal model 250. In an example, image processing programming of computer 104 may skeletonize an image of operator 205 by making successive passes of the image obtained by a dashboard mounted camera 210. In accordance with a skeletonization algorithm, during successive frame-by-frame image processing operations, border pixels can be identified and removed from a current image frame based on whether the border pixels of the current image frame break connectivity with an image frame represented by the remaining pixels of the image in a subsequent frame. Accordingly, based on the image processing programming determining that all, or substantially all, pixels remaining in a current frame retain their connectivity with an image from a previous frame, nodal model 250 can be generated.

Responsive to generating nodal model 250, computer 104 can execute programming to compare whether the nodal model is consistent with, or at least approximates, a nodal model of an operator having one or more hands in contact with, e.g., resting on, steering wheel 124. For example, computer 104 may utilize a measure of an angle of a line drawn between nodes representing the shoulders of operator 205. Alternatively, or in addition, computer 104 may utilize a measure of an angle between a line drawn between nodes representing the shoulders of operator 205 and a line representing an upper arm of the operator. Alternatively, or in addition, computer 104 may utilize a measure of an angle between a line representing an upper arm of operator 205 and the operator's lower arm. Alternatively, or in addition, computer 104 may utilize a distance between a line representing an upper arm of operator 205 and a point on a line drawn between nodes representing the shoulders of operator 205. Computer 104 may utilize additional parameters of nodal model 250 in determining whether the nodal model is consistent with a nodal model of an operator having one or more hands in contact with steering wheel 124.

In an example, computer 104 may be programmed to implement a machine-learning technique, e.g., a neural network, capable of predicting whether one or more hands of operator 205 are in contact with, e.g., resting on, steering wheel 124 based on nodal model 250. For example, a neural network could be trained to receive an image of operator 205, aggregated with additional data, such as data from other cameras/sensors in the interior of vehicle 102, describing the position and movements of the operator. The neural network could predict the skeletonization model, confidence, hands-on-wheel status, and predicted applied torque. The predicted skeletonization model confidence, e.g., hands-on-wheel status, etc., can be compared with actual instances of operator 205 having one or more hands in contact with steering wheel 124. In an example, a time-series of predicted torque and measured torque could be filtered to exclude certain one-time events such as vehicle 102, for example, encountering a speed bump, a depression in the path of the vehicle, etc. In an example, ground truth data collection can be utilized to train the neural network or to provide training for use with another machine learning technique. Ground truth data collection could be in accordance with techniques utilized by the Datagen company located at HaMelacha St. 3. Tel Aviv, Israel 6721503 (https://datagen.tech). Responsive to initial training of a machine-learning implementation, cross correlation and/or time series analyses could be utilized to determine whether a machine-learning implementation is consistent and/or correlated over a time window, such as a time window during which operator 205 intermittently places hands into contact with steering wheel 124. A machine learning model can be manually adjusted for certain variations, such as to account for the size and stature of operator 205 and the effects of an operator's larger-sized hands versus smaller-sized hands on torque applied to steering wheel 124.

In some examples, programming of computer 104 performs a comparison of nodal model 250 with nodal models of an operator known to have one or more hands placed into contact with steering wheel 124. Such reference nodal models, or parameters derived from nodal models, can be stored in a memory accessible to computer 104. In such instances, nodal models of an operator with one or more hands in contact with steering wheel 124 can be compared with nodal models of an operator without one or more hands distant from the steering wheel. For example, a nodal model of an operator with a hand placed into contact with steering wheel 124 may exhibit a particular angle, or range of angles, between a line representing an upper arm and a line drawn between nodes representing the shoulders of the operator. Thus, in response to nodal model 250 exhibiting a similar angle between a line representing an upper arm of operator 205 and a line drawn between nodes representing the shoulders of operator 205, computer 104 may determine a level of confidence that at least one hand of operator 205 is in contact with steering wheel 124.

In an example, computer 104 can execute programming to estimate a location or locations of one or more hands or other features of operator 205 based on comparisons with nodal models, e.g., nodal models derived from images of operators similar to operator 205, stored in a memory of computer 104. In an example, computer 104 can define a coordinate system, e.g., a three-dimensional (3D) Cartesian coordinate system with a specified origin and orthogonal X, Y, and Z axes, for the interior of vehicle 102. The coordinate system can be used to describe attributes of camera 210, such as camera pose, focal depth, etc. Further, defining a coordinate system for the interior of vehicle 102 can allow computer 104 to specify locations of the nodes of nodal model 250 with respect to defined coordinate system. For example, responsive to determining that a line representing an upper arm portion of operator 205 slopes in a direction towards the base of the driver's seat, as seen in FIG. 2B, computer 104 can estimate the position of the right forearm and hand of operator 205 based on comparisons with nodal models stored in a memory of computer 104. In another example, also as seen in FIG. 2A, the node representing the left elbow of operator 205 is below the node representing the left shoulder of the operator. Accordingly, computer 104 can estimate the location of the left forearm and left hand of operator 205 based on comparisons with nodal models stored in a memory of computer 104.

In some examples, programming of computer 104 may implement a suitable learning model of operator 205 that refines, over a period of time, estimations of whether operator the hands of operator 205 are in contact with steering vehicle 102, e.g., placing hands into contact with steering wheel 124. For example, a learning model may include use of a nodal model that includes a node representing the head position relative to other nodes of operator 205, an eye gaze direction of the operator, other locations of nodes representing the arms of operator 205, and so forth. Further, a learning model can access nodal models of operators of vehicles having capabilities similar to those of vehicle 102, such as via accessing WAN 116 (of FIG. 1) and server 118. Thus, computer 104 of vehicle 102 may cooperate with similar vehicles, which may further refine the capability to estimate locations of the features of operator 205 that are excluded from the field of view of camera 210.

In an example, nodal models of operators known to have one or more hands placed into contact with steering wheel 124 (which may be referred to as reference models) may be stored in a memory accessible to computer 104. Determination of whether nodal model 250 is consistent with a reference nodal model of an operator known to have one or more hands placed into contact with steering wheel 124 can be the result of applying a suitable supervised machine learning process, such as via server 118, which can utilize a corpus of nodal models representing operators having one or more hands in contact with, or (conversely) one or more hands separated from, steering wheel 124. In another example, a suitable unsupervised machine learning technique may be utilized, such as a generative adversarial network, which executes unsupervised development and/or refinement of a process of determining whether one or more hands of operator 205 are in contact with steering wheel 124. Thus, for example, during an unsupervised training process, programming steps executed by computer 104 and/or server 118 can generate nodal models of operators having hands placed into contact (e.g., "hands on"), or, conversely, separated from (e.g., "hands off"), steering wheel 124. Such nodal models can be evaluated and/or reviewed by programming of computer 104 without the benefit of obtaining an advanced indication of the hands on/hands off state of the generated nodal models. Responsive to computer 104 inaccurately identifying a hands on/hands off state of operator 205, one or more parameters of a generated nodal model can be modified. In response to modification of parameters of a nodal model, the generative adversarial network may present the same or similar nodal model for review by computer 104. Accordingly, in an example training environment, which may be hosted by server 118 cooperating with computer 104, the generative adversarial network can iteratively repeat a process of generating of a nodal model, followed by attempted hands-on/hands off detection by programming of computer 104, refinement of parameters of a nodal model, generation of another nodal model, etc.

Computer 104 can then execute programming to determine a level of confidence that estimated feature locations of an operator, e.g., estimated feature locations 255, 260, accord with feature locations of an operator with a hand (or hands) placed into contact with steering wheel 124. In this context, a "level of confidence" or "confidence level" means a degree to which nodal model 250 agrees with a nodal model known to represent an operator having one or more hands placed into contact with steering wheel 124. Thus, for example, a perfect agreement between nodal model 250 and a nodal model, stored in a memory accessible to computer 104, of an operator known to have one or more hands in contact with steering wheel 124 can be assigned a level of confidence of 100%. In another example, a significant disagreement between nodal model 250 and a nodal model stored or accessible to computer 104 can be assigned a lower level of confidence, such as 80%, 75%, etc.

Also in this context, an "estimated feature location" means a predicted location of a limb of operator 205 that is excluded or obscured from view of camera 210 based on observed locations of the features of operator 205 represented by nodal model 250. For example, as seen in FIG. 2B, estimated feature location 255, which corresponds to the right forearm and hand of operator 205, lies nearby estimated feature location 270, which represents the legs of operator 205. Thus, programming of computer 104 may assign a relatively low level of confidence that the right hand of operator 205 is in contact with steering wheel 124. In another example, also as seen in FIG. 2B, estimated feature location 260, which corresponds to the left forearm and hand of operator 205, is positioned, e.g., in the coordinate system of the interior of vehicle 102, at a location that approaches steering wheel 124. Thus, computer 104 may assign a relatively high level of confidence that the left hand of operator 205 is in contact with steering wheel 124.

In an example for a machine learning model implementing a neural network, a confidence level can be increased utilizing a Bayesian neural network or an ensemble approach in which the variance in a confidence level can be decreased by generating additional data for training from dataset using combinations with repetitions to produce multi-sets of an original data set. Further, in an example, a confidence level can be increased utilizing input signals from other components of HMI 112 of vehicle 102. For example, responsive to operator 205 interacting with an infotainment component of vehicle 102, which can be validated utilizing input signals from the infotainment component, can also be validated to increase predictions or confidence levels of nodal model 250. In another example, a first nodal model could be generated utilizing features extracted from images captured by camera 210 and from a second camera having a field of view of the interior of vehicle 102. Nodal models resulting from programming of computer 104 extracting features captured by camera 210 and from the second camera could enhance confidence in the prediction of the position of the hands of operator 205. A level of confidence could be further enhanced during operation of a vehicle at times of the day when sun glare on camera 210 is minimal. Further, responsive to operator 205 applying propulsion commands, the operator may be more likely to place hands into contact with steering element 124. During such times, a confidence level can be increased in response to operator 205 applying propulsion commands to vehicle 102 during which, operator 205 may be likely to place one or more hands into contact with steering element 124.

In an example, programming of computer 104 can estimate a predicted torque conveyed to steering column 126 in response to one or more hands of operator 205 being in contact with steering wheel 124. For example, in response to computer 104 determining, e.g., with a relatively high level of confidence, that the hands and forearms of operator 205 are in contact with steering wheel 124, computer 104 can predict an expected torque measured by torque sensor 122. For example, responsive to computer 104 determining with a relatively high level of confidence that a hand of operator 205 is resting on steering wheel 124, computer 104 can predict, based on measurements of previous instances, that torque sensor 122 will measure a steering column torque of 0.05 Nm corresponding to the weight of the hand of operator 205. In another example, responsive to computer 104 determining with a relatively high level of confidence that both hands of operator 205 are resting on steering wheel 124, computer 104 can predict that torque sensor will measure a steering column torque of 0.10 Nm corresponding to the weight of both hands of operator 205.

Figure 3A:
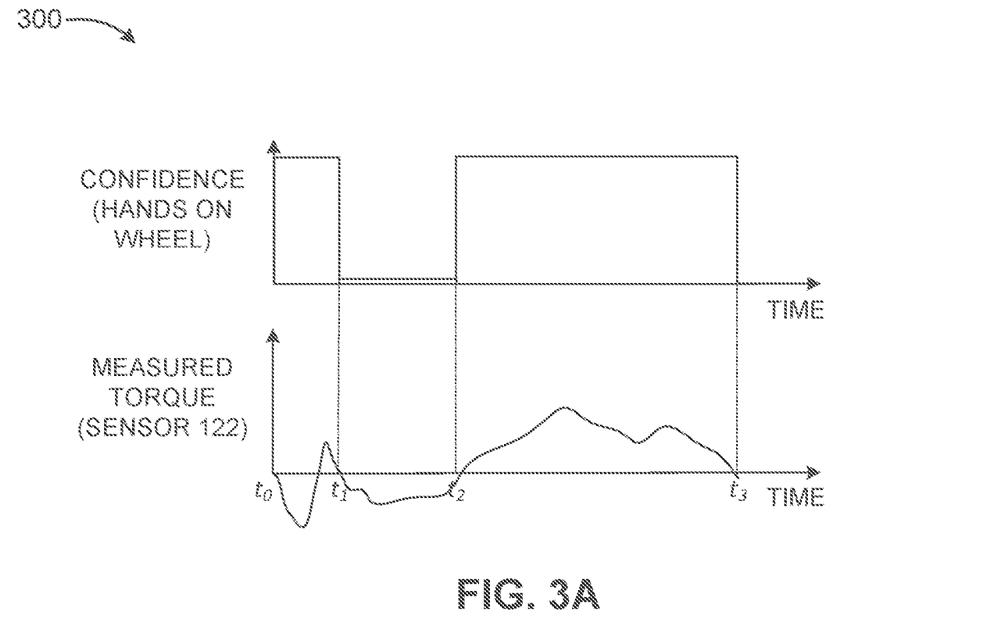
FIGS. 3A, 3B are example graphs showing a level of confidence that an operator's hands are in contact with a steering wheel.
Figure 3B:
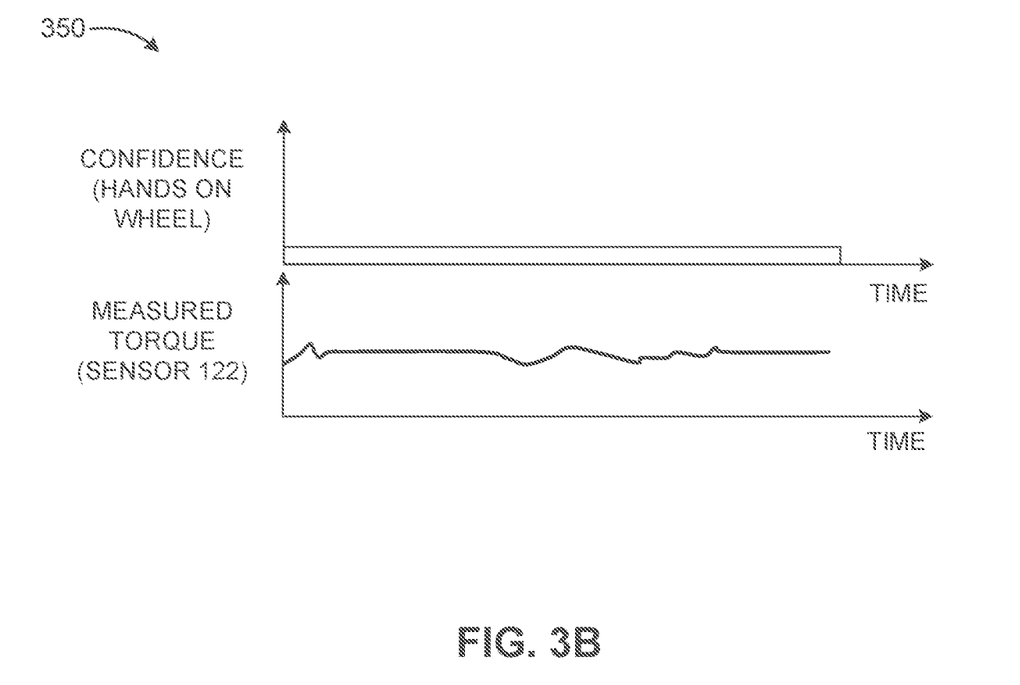

FIGS. 3A-3B are example graphs showing a level of confidence that an operator's hands are in contact with a steering element along with a measured torque. As described in reference to FIGS. 2A, 2B, dashboard mounted camera 210 can capture an image of operator 205 of vehicle 102, wherein certain features of the operator are obscured from the camera's field-of-view. Image processing programming operating on computer 104 can execute, for example, a skeletonization algorithm, in which during successive frame-by-frame image processing operations, border pixels are identified and removed from a current image frame based on whether the border pixels of the current image frame break connectivity with an image frame represented by the remaining pixels of the image in a subsequent frame. Based on the image processing programming determining that all, or substantially all, pixels remaining in a current frame retain their connectivity with an image from a previous frame, nodal model 250 can be generated. Computer 104 can then estimate locations of features obscured the camera's field-of-view and determine the level of confidence that such features are indicative of the hands of operator 205 being in contact with steering wheel 124. Based on the correlation between the level of confidence that operator 205 has placed one or more hands into contact with steering wheel 124 and output data from torque sensor 122, computer 104 can determine whether the signal outputs from torque sensor 122 can be treated as representative of operator 205 having one or more hands placed into contact with steering wheel 124. Thus, in an example, in response to computer 104 determining a high level of confidence (e.g., greater than 95%) that an operator has placed one or more hands into contact with steering wheel 124, computer 104 may be programmed to determine that signal outputs from torque sensor 122 indicate that the operator has one or more hands in contact with steering wheel 124. In response to computer 104 determining a low level of confidence (e.g., less than 60%) that an operator has placed one or more hands into contact with steering wheel 124, computer 104 may be programmed not to output a determination that signal outputs from torque sensor 122 indicate that the operator has one or more hands in contact with steering wheel 124.

As shown in example 300, based on nodal model 250 of operator 205, programming of computer 104 may be executed to determine a confidence level that operator 205 has at least one hand in contact with steering wheel 124. The confidence level may then be correlated with output data from torque sensor 122. Such correlations (e.g., correlations greater than 0.95) between the confidence level and output data from torque sensor 122 can be utilized to determine that the output data of from torque sensor 122 represents operator 205 having one or more hands placed into contact with steering wheel 124. Any suitable technique for computing correlation may be utilized, such as computing a Pearson correlation coefficient, a Matthews correlation coefficient, etc. Thus, as seen in FIG. 3A, over a duration, e.g., between time $t_0$ and time $t_1$, programming of computer 104 may compute a relatively high confidence level, which may be correlated with output data from sensor 122 indicating varying (positive and negative) levels of torque being applied to steering wheel 124. However, as also can be seen in FIG. 3A, between time $t_1$ and time $t_2$, programming of computer 104 may compute a relatively low confidence level, which may be correlated with output data from sensor 122 indicating varying levels of torque. Accordingly, data from torque sensor 122 may be below a specified confidence threshold. The specified threshold can be set by an assisted driving application, e.g., ADAS, according to design parameters of such applications. For example, where the confidence in torque output data is low, it may be likely that the operator 205 has removed hands from steering wheel 124 and perhaps has momentarily positioned a foreign object on the steering wheel. Between time $t_2$ and time $t_3$, computer 104 may compute a relatively high confidence level, which may indicate that operator 205 has again placed one or more hands into contact with steering wheel 124. Accordingly, data from torque sensor 122 may be assigned a confidence level exceeding a threshold, thereby indicating the operator 205 having one or more hands in contact with steering wheel 124.

In example graphs 350, shown in FIG. 3B, based on nodal model 250 of operator 205, programming of computer 104 may compute a confidence level that operator 205 has at least one hand in contact with steering wheel 124. As seen in FIG. 3B, computer 104 has computed a relatively low confidence level. As previously described, computer 104 may compute such relatively low confidence level in response to estimating that the hands of operator 205 are likely not in contact with steering wheel 124. However, as also seen in FIG. 3B, output data from torque sensor 122 indicates that a relatively constant value of torque has been applied to steering wheel 124. Accordingly, a low correlation exists between the confidence level computed by computer 104 and torque activity. Thus, output data from torque sensor 122 may be assigned a confidence level below a threshold, thereby indicating the operator 205 cannot be deemed to have placed one or more hands into contact with steering wheel 124. Such low correlations (e.g., less than 0.8) between a confidence level computed by computer 104 and torque activity may indicate that operator 250 has placed a foreign object, such as a laptop computer, entertainment device, etc., on steering wheel 124.

Figure 4:
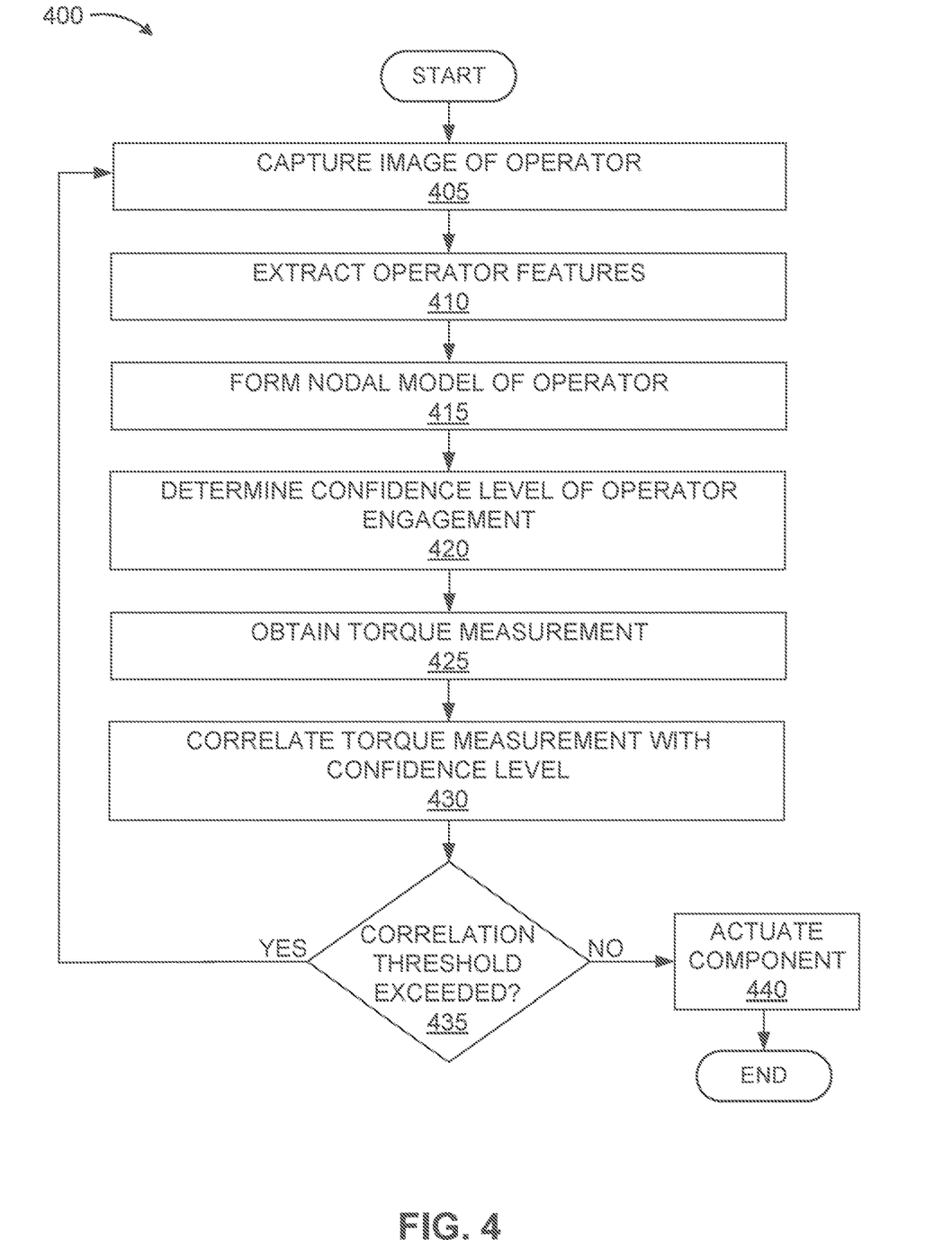
FIG. 4 is a process flow diagram illustrating an example process for detecting operator contact with a steering wheel.

FIG. 4 is a process flow diagram 400 illustrating an example process for detecting contact of operator 205 with steering wheel 124. Process 400 can begin at block 405, such as in response to vehicle 102 being placed into an ON state, or in a "drive" state to operate on a roadway, for example. Block 405 can include dashboard mounted camera 210 capturing an image of a vehicle 102 interior that may include operator 205, in which the captured image may exclude certain features, e.g., the forearms and hands of operator 205.

Process 400 may continue at block 410, which can include computer 104 executing image processing, such as a skeletonization technique, in which, in each of several processing frames, border pixels of an image frame are determined to be connected or unconnected with other pixels in the processing frame. Responsive to pixels being unconnected, such pixels are removed and a subsequent processing frame is initiated. The skeletonization technique typically completes after no additional unconnected pixels are present in a processing frame. Block 410 may include extraction of parameters representing additional features of operator 205, such as determining a head orientation of the operator, an eye gaze direction of the operator, etc.

Process 400 can continue at block 415, which can include forming a nodal model of operator 205 responsive to computer 104 executing the skeletonization technique performed at block 410. Computer 104 can execute programming to estimate locations of features excluded from the field-of-view of camera 210, such as the locations of forearms and hands of operator 205. Computer 104 may access a database of nodal models similar to the nodal model of operator 205 and/or may employ a learning model of operator 205 in which estimations of feature locations are refined, over a period of time, to enhance the accuracy of estimated feature locations.

In an example, in which programming of computer 104 implements a neural network to determine a confidence level, block 415 may be omitted. In such an example, the neural network could operate to analyze parameters extracted from images captured by camera 210 without applying a skeletonization technique, for example, to parameters extracted from captured images.

Process 400 can continue at block 420, which can include computer 104 executing programming to determine a level of confidence, based on nodal model 250, that one or more hands of operator 205 are in contact with steering wheel 124. For example, based on nodal model 250 indicating the estimated locations of the hands of operator 205 are proximate with steering wheel 124, computer 104 can assign a relatively high level of confidence that operator 205 has one or more hands in contact with a steering element of vehicle 102. In another example, based on nodal model 250 indicating that the estimated locations of the hands of operator 205 are distant from steering wheel 124, computer 104 can assign a relatively low level of confidence that operator 205 has one or more hands in contact with a steering element of vehicle 102.

Process 400 can continue at block 425, which can include computer 104 obtaining torque measurements from torque sensor 122. Torque sensor 122 may include any suitable torque measuring device, such as a calibrated strain gauge, for example, which may output a signal trace as a function of time. In an example, torque sensor 122 can output a nonzero or non-negligible signal, e.g., responsive to one or more hands of operator 205 being in contact with steering wheel 124.

Process 400 can continue at block 430, which can include computer 104 executing programming to correlate the confidence level obtained at block 420 based on the nodal model 250 of an obtained image with measurements from torque sensor 122. Computer 104 can compute a correlation coefficient via any suitable technique, such as via a Pearson correlation coefficient, a Matthews correlation coefficient, etc.) Correlation at block 430 can enhance a likelihood that output data from torque sensor 122 indicates that operator 205 is engaged, e.g., hands of operator 205 placed into contact with steering wheel 124, in operating vehicle 102. In an example, in response to computer 104 assigning a relatively low level of confidence that the hands of operator 205 are in contact with steering wheel 124, programming of computer 104 may determine not to provide output that the operator 205 has one or more hands in contact with steering wheel 124. In such an instance, signals from torque sensor 122 may be representative of the weight of a foreign object, e.g., a water bottle, a piece of fruit, a coffee cup, a laptop, etc., is resting on steering wheel 124 rather than one or more hands of operator 205. In another example, in response to computer 104 assigning a relatively high level of confidence that the hands of operator 205 are in contact with steering wheel 124, programming of computer 104 may determine that the output signals from torque sensor 122 represent the condition of operator 205 having one or more hands in contact with steering wheel 124.

Process 400 can continue at block 435, which includes computer 104 executing programming to determine whether a correlation between the level of confidence that the hands of operator 205 are in contact with steering wheel 124 and measurements from torque sensor 122 is above a predetermined threshold. In response to the determined correlation exceeding a threshold (e.g., greater than 0.95), process 400 may return to block 405, at which camera 210 captures a second image of operator 205. Accordingly, it can be seen that process 400 represents a dynamic operator monitoring loop in which, at predetermined intervals, camera 210 captures an image of operator 205 (block 405). The image is then processed to form a nodal model and to estimate locations of features excluded from the camera's field of view (block 410, 415). The confidence level is then determined (block 420), correlated with torque measurements (block 425), and a determination that the operator currently has one or more hands in contact with steering wheel 124 is output based on the correlation (block 430).

Responsive to determining, at block 435, that less than a predetermined threshold level of correlation (e.g., less than 0.95) exists between a confidence level determined at block 420 and output signals from torque sensor 122, process 400 may continue at block 440, in which the computer 104 can output a signal or command to actuate a component 110 of the vehicle 102. A correlation less than the predetermined threshold may represent a circumstance in which operator 205 has placed a foreign object on steering wheel 124. In an example, block 440 may include computer 104 actuating or generating a message to operator 205 via HMI 112. Alternatively, or in addition, computer 104 can initiate a haptic output to steering wheel 124 or could cause the HMI 112 to output an audible signal. Yet further alternatively or additionally, the computer 104 could output a command to control a subsystem or component 110 including steering, braking, and/or propulsion of the vehicle 102, e.g., to steer and/or slow the vehicle 102 in response to determining that an operator's hand(s) is (or are) not in contact with the steering wheel.

After block 440, process 400 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The adjectives first and second are used throughout this document as identifiers and, unless explicitly stated otherwise, are not intended to signify importance, order, or quantity.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship.

Computer executable instructions may be compiled or interpreted from computer programs created using a variety of programming languages and/or technologies, including, without limitation, and either alone or in combination, Java, C, C++, Visual Basic, Java Script, Perl, Python, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

What is claimed is:

1. A system, comprising a computer including a processor and a memory, the memory storing instructions executable by the processor to:
    capture an image of an operator positioned in a steering position;
    determine, based on parameters extracted from the captured image, a correlation between a confidence level that the operator is in contact with a steering element and data output from a torque sensor; and
    actuate a component in a vehicle based on the determined correlation.

2. The system of claim 1, wherein the output data from the torque sensor represents torque applied as a function of time, and wherein the steering element includes a steering wheel.

3. The system of claim 1, wherein the output data from the torque sensor is obtained over a duration, and wherein the image of the operator is captured during the duration.

4. The system of claim 1, wherein the output data from the torque sensor represents a torsion moment applied to the steering element.

5. The system of claim 1, wherein the instructions further include instructions to extract parameters of the operator via a non-camera sensor.

6. The system of claim 1, wherein the output data from the torque sensor indicates a weight applied to the steering element.

7. The system of claim 1, wherein the instructions further include instructions to obtain input signals from a capacitive sensor of the steering element.

8. The system of claim 1, wherein the extracted parameters include a head position of the operator.

9. The system of claim 1, wherein the extracted parameters include an eye gaze direction of the operator.

10. The system of claim 1, wherein the extracted parameters include a location of an arm of the operator.

11. The system of claim 1, wherein the instructions further include instructions to estimate a location of a feature of the operator obscured from a field-of-view of a camera capturing the image.

12. The system of claim 1, wherein the instructions further include instructions to implement a learning model of the operator having one or more hands in contact with the steering element based on one or more of a head position of the operator, an eye gaze direction of the operator, or a location of an arm of the operator.

13. The system of claim 1, wherein the instructions further include instructions to correlate the data output from the torque sensor prior to actuation of the component.

14. A method comprising:
    capturing an image of an operator positioned in a steering position;
    determining, based on parameters extracted from the captured image, a correlation between a confidence level that the operator is in contact with a steering element and data output from a torque sensor; and
    actuating a component in a vehicle based on the determined correlation.

15. The method of claim 14, wherein the output data from the torque sensor represents torque applied as a function of time, and wherein the steering element includes a steering wheel.

16. The method of claim 14, wherein the output data from the torque sensor is obtained over a duration, and wherein the image of the operator is captured during the duration.

17. The method of claim 14, wherein the image includes a camera image and/or an image derived from a non-camera sensor.

18. The method of claim 14, wherein the extracted parameters include a head position of the operator, an eye gaze direction of the operator, or an orientation of an arm of the operator.

19. The method of claim 14, further comprising:
   estimating a location of a feature of the operator obscured from a field-of-view of a camera capturing the image.

20. The method of claim 14, further comprising:
   implementing a learning model of operator contact with the steering element based on one or more of a head position of the operator, an eye gaze direction of the operator, and/or an orientation of an arm of the operator.

* * * * *